Sept. 9, 1952  B. F. SPRAGUE  2,609,604
DENTAL SCREW INSERT
Filed Feb. 14, 1949

INVENTOR.
Boyd F. Sprague
BY
Atty.

Patented Sept. 9, 1952

2,609,604

UNITED STATES PATENT OFFICE 2,609,604

DENTAL SCREW INSERT

Boyd F. Sprague, Klamath Falls, Oreg.

Application February 14, 1949, Serial No. 76,220

7 Claims. (Cl. 32—1)

My invention pertains to screw inserts, and relates particularly to a novel screw construction for use in plugging the socket of an extracted tooth. In a growing child the extraction of a permanent tooth tends to cause the jawbone to collapse and fill the cavity. This causes the teeth adjacent the cavity to move together, thus resulting in a malformed arch. It has been the practice heretofore to fill the gap formed by such extraction with some form of space retainer such as a stationary bridge. This type of installation inhibits the natural development of the young arch and results in undesirable irritation of the surface of the anchor teeth.

Similarly, the extraction of an adult tooth results in a definite absorption of the gum and bone tissue. Thus, with a conventional bridge placed in the space previously occupied by the extracted tooth, subsequent shrinkage of gum and bone tissue results in the undesirable appearance of an excessively elongated tooth surface.

It is a principal object of my invention, therefore, to provide a dental insert for use in plugging the socket of an extracted tooth and thereby to hold open the space formerly occupied by said tooth.

Another important object of my invention is the provision of a dental insert which, while plugging the socket of an extracted tooth, affords drainage from said socket.

A further object is the provision of a dental insert to be driven into the socket of an extracted tooth and constructed in such manner as to permit ready escape of air from said socket as the insert is being installed, thereby preventing the development of harmful pressures upon the surrounding areas.

A further object is to provide a dental insert in which a central cavity is available for subsequent use in anchoring a false tooth to said insert for filling in the space previously occupied by the visible portion of the extracted tooth.

A still further object of my invention is the provision of a novel screw construction by which convenient and positive attachment of said screw to diverse types of anchoring materials is readily accommodated.

A further object is the provision in a screw insert of a novel head construction by which screw driver means for driving said insert is automatically centered upon said head.

Figure 1:
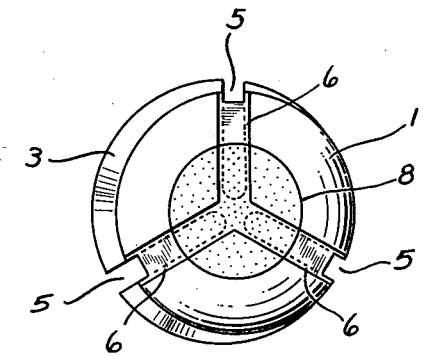
Figure 2:
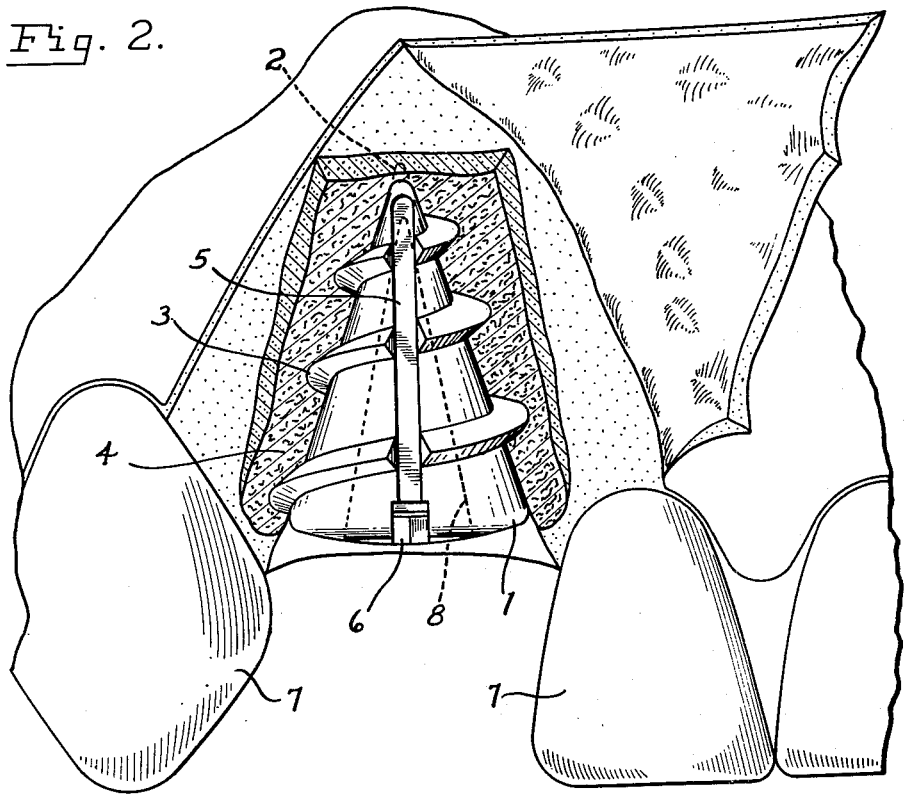

These and other objects and advantages of my invention will appear from the following detailed description taken in connection with the accompanying drawing, in which:

Fig. 1 is a plan view of a dental insert embodying the features of my invention; and Fig. 2 is a fragmentary side elevation of a jaw, a portion thereof being broken away to disclose the socket of an extracted tooth with the dental insert embodying my invention installed therein.

A dental insert embodying my invention comprises a substantially conical screw body 1 conforming in general shape to the socket 2 of the extracted tooth. The body is slightly shorter in length than the full depth of the root cavity. The body 1 is provided with a projecting screw thread 3 extending spirally therearound from the apex to the base. The screw is formed preferably of materials which are incapable of producing appreciable electrolytic action. The metal alloy "Vitallium" (65% cobalt, 30% chromium and and 5% molybdenum) has been found satisfactory for the purpose, as have many of the thermosetting and thermoplastic resins of commerce. In general, any of the latter materials, or a combination thereof, are suitable, provided they possess the strength necessary to withstand the driving force exerted when installing the insert in a tooth socket.

When driving the screw into an empty socket, it is desirable that the air entrapped in the latter may be allowed to escape, for otherwise substantial air pressure is caused to be impressed upon the surrounding bone area 4 of the jaw. I provide such means on the screw in the form of one or more grooves 5 which extend longitudinally of the body 1 from the apex to the base. Although I have shown three such grooves formed at spaced intervals about the periphery of the screw body, it is to be understood that any number of grooves may be provided, as desired. These grooves also provide means for the drainage of the socket 2.

The base or head of the tapered screw body 1 is preferably rounded in convex form in the shape of a half oval or a segment of a sphere. A plurality of grooves 6 having uniform depth are formed in said base extending radially to the outer periphery. The base of said grooves thus curves in convex manner away from the central point of said base. In the insert illustrated in the drawing, I have shown three grooves 6. These grooves form substantial extensions of the three longitudinal grooves 5 for convenience in construction. It is to be understood, however, that although such construction is to be preferred, other forms comprising different numbers and relative positions of grooves may be employed. In any case the grooves 6 are utilized to advantage in applying a screw driver to the insert for purposes of installing the latter. The screw driver is formed with radial bits conforming in number and position to the radial grooves 6, and said bit end should be of concave shape to complement the convex form of the grooves 6. With this construction, the screw driver becomes automatically centered upon the base of the insert and accidental lateral displacement of said driver is thereby obviated. This construction finds partial utility in such cases where accidental slipping of the screw driver is apt to cause serious injury or damage to the surrounding area. For example, in installing the dental insert described hereinabove, accidental slipping of the screw driver might result in serious damage to the gum or other parts of the mouth. The novel base construction described above reduces this possibility to a minimum.

As shown in Fig. 2 of the drawing, the screw is inserted in the socket 2 to a depth at which the base of the screw lies slightly below the upper surface of the gums. The gums may thus close over and cover the head of the screw whereby the possibility of subsequent shrinkage and recession of the gum is obviated. The apex of the screw terminates slightly above the apex of the socket 2, thus permitting a degree of flexibility of the bony structure of the jaw.

It is to be noted that the screw insert need not extend laterally into abutment with the teeth 7 disposed adjacent the cavity formed by the extracted tooth. It has been found that by merely plugging the socket 2 the bony structure of the jaw is braced sufficiently to maintain the teeth 7 in proper alinement and to prevent the tendency of said teeth to move together. After the gums have healed over the head of the screw, the gap between the teeth 7 may be closed by the installation of a conventional bridge, if so desired. In the form of my invention illustrated in the drawing, a tapered hole 8 extends axially into said screw body 1 and serves as fastening means for anchoring a false tooth which may later be fitted into the space previously occupied by the visible portion of the extracted tooth. Since the false tooth is usually not inserted until the cavity has healed, the hole 8 may be filled temporarily with a plastic material in order to provide a solid insert. The plastic filling may be drilled out at the time of insertion of the false tooth, or it may be retained in the hole 8 if it is desired to use a conventional bridge thereover.

The dental technic which may, by way of example, illustrate one use for the dental insert of the instant invention or a similar insert is fully described in my copending method application, Serial No. 76,301, filed February 14, 1949, and entitled Dental Technic.

In installing the dental insert embodying my invention, the root of an extracted tooth is measured for approximating the size of the socket 2. A dental insert having a slightly larger diameter than that of the tooth root but shorter in length than said root is then selected and driven into the socket by means of a screw driver of proper size and shape to a position at which the head of the screw lies just below the upper surface of the gum. Air entrapped in the socket below the screw is released to the atmosphere through the longitudinal grooves 5. The spiral thread 3 is embedded firmly in the bony structure surrounding the socket 2, and the grooves 5 which sever said thread at intervals along its length tend to prevent accidental rotation and consequent loosening of the screw.

While I have described the features of my invention as applied to a dental insert, it is evident that the screw may be employed with other materials such as wood, plastic and metal. Because of the natural resilience of wood, the latter is drawn into the groove 5 to hold the screw against inadvertent displacement in a manner similar to that of the flexible growing bony structure of the jaw. With rigid materials such as plastic or metal, however, it may be desirable to anchor the screw by driving a key into the longitudinal slot 5 to provide a positive lock between the screw and the surrounding supporting material.

I claim:

1. A dental insert for plugging the socket formed by the extraction of a tooth, comprising a conical body, a screw thread extending spirally about the periphery of said conical body from apex to base, and at least one groove formed in the peripheral surface of said body and extending longitudinally thereof from apex to base, said body having a conical hole means extending axially therein toward the apex thereof for securing a false tooth detachably to said insert, said hole being filled temporarily with a plastic material capable of being removed when said false tooth is to be installed.

2. A dental insert for plugging the socket formed by the extraction of a tooth, comprising a substantially conical body, said body having a conical hole means extending axially therein from the base to adjacent the apex thereof, a screw thread extending spirally about the periphery of said conical body from apex to base, and at least one groove formed in the peripheral surface of said body and extending longitudinally thereof from apex to base, the base of said insert being rounded convexly and carrying a convex groove means extending radially to the outer periphery thereof and intercepting said first named groove for receiving and automatically centering a complementary-shaped screw driver.

3. A dental insert for plugging the socket formed by the extraction of a tooth, comprising a substantially conical body, a screw thread extending spirally about the periphery of said conical body from apex to base, a plurality of straight grooves equi-spaced about the peripheral surface of said body and extending longitudinally thereof from apex to base, the base of said insert having a corresponding plurality of convex groove means extending radially to the outer periphery thereof and intercepting the longitudinal grooves in said insert for receiving and automatically centering complementary-shaped screw driver means for installing said insert, and a conical hole means complementary to and recessed axially into said conical body and intercepting said convex grooves.

4. A dental insert for plugging the socket formed by the extraction of a tooth, comprising a conical body having a convex base, a screw thread extending spirally about the periphery of said conical body from apex to base, and at least one groove formed in the peripheral surface of said body and extending longitudinally thereof from apex to base, said body having a conical hole means extending axially therein toward the apex thereof for securing a false tooth detachably to said insert, said hole being filled temporarily with a plastic material capable of being removed when said false tooth is to be installed, said plastic material being convex at the base thereof to conform to said convex base, the base of said insert having a convex groove means extending radially to the outer periphery thereof for receiving and automatically centering complementary-shaped screw driver means for installing said insert.

5. A screw insert for plugging a tapered hole, comprising a substantially conical body proportional to conform substantially to the shape of said hole but wider than said hole, a screw thread extending spirally about the periphery of said body, and at least one groove formed in the peripheral surface of said body and extending longitudinally thereof from apex to base in a straight line, said body having a hole extending axially therein toward the apex thereof for securing an object to said insert, said hole being filled temporarily with a plastic material capable of being removed when said object is to be inserted therein.

6. A screw insert for plugging a tapered hole, comprising a conical body proportioned to conform substantially to the shape of said hole, a screw thread extending spirally about the periphery of said body, and at least one groove formed in the peripheral surface of said body and extending longitudinally thereof from apex to base, said groove severing the screw thread at intervals along its length to provide means for securing said screw insert in said hole, said body having a conical hole means extending axially therein toward the apex thereof for securing an object to said insert, said hole being filled temporarily with a plastic material capable of being removed when said object is to be inserted.

7. A screw insert for plugging a tapered hole, comprising a conical body proportioned to conform substantially to the shape of said hole and having a convex base portion, a screw thread extending spirally about the periphery of said body, and three straight grooves of uniform width and depth spaced equi-distant about the peripheral surface of said body and extending longitudinally thereof from apex to base, said body having a conical hole means extending axially therein toward the apex thereof for securing an object to said insert, said hole being filled temporarily with a plastic material capable of being removed when said object is to be installed, the base of said insert having three equi-spaced convex grooves extending radially to the outer periphery thereof and intercepting said first named grooves, said convex grooves being formed partially in said plastic and providing means for receiving and automatically centering complementary-shaped screw driver means for installing said insert.

BOYD F. SPRAGUE.

REFERENCES CITED

The following references are of record in the file of this patent:

UNITED STATES PATENTS

| Number | Name | Date |
|---|---|---|
| 581,335 | Carr | Apr. 27, 1897 |
| 1,000,280 | Messenger | Aug. 8, 1911 |
| 1,055,294 | Stevenson | Mar. 4, 1913 |
| 2,278,411 | Braendel | Apr. 7, 1942 |
| 2,347,567 | Kresse | Apr. 25, 1944 |
| 2,449,522 | White | Sept. 14, 1948 |